Figure 1:
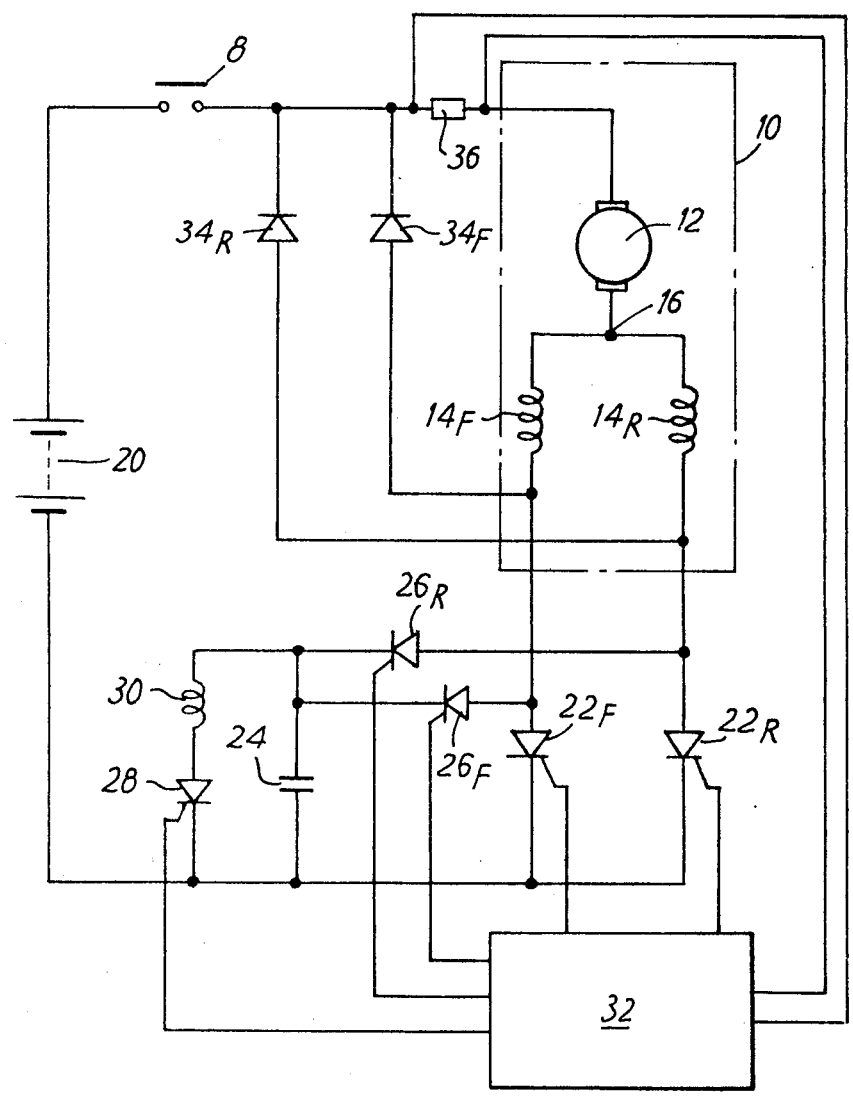

United States Patent [19]

Sloan

[11] 4,385,266
[45] May 24, 1983

[54] FIELD WEAKENING SYSTEM FOR PULSE-CONTROLLED THREE-TERMINAL D.C. MOTOR

[75] Inventor: Albert E. Sloan, Gateshead, England

[73] Assignee: Technical Operations Limited, Gateshead Nell, England

[21] Appl. No.: 243,538

[22] Filed: Mar. 13, 1981

[30] Foreign Application Priority Data

Mar. 18, 1980 [GB] United Kingdom ................ 8009097

[51] Int. Cl.³ .............................................. H02P 5/16
[52] U.S. Cl. .................................... 318/252; 318/338; 318/523
[58] Field of Search ............... 318/251, 252, 338, 350, 318/351, 353, 356, 523, 525, 532, 537

[56] References Cited

U.S. PATENT DOCUMENTS

| | | | |
|---|---|---|---|
| 3,398,344 | 8/1968 | McCormick | 318/252 |
| 3,562,616 | 2/1971 | Elliott | 318/252 X |
| 3,764,873 | 10/1973 | Elliott | 318/252 |
| 4,042,865 | 8/1977 | Gurwicz | 318/338 |
| 4,345,190 | 8/1982 | Horiuchi et al. | 318/338 |

Primary Examiner—J. V. Truhe
Assistant Examiner—W. E. Duncanson, Jr.
Attorney, Agent, or Firm—Wolf, Greenfield & Sacks

[57] ABSTRACT

A pulse control circuit for a d.c. series motor having an armature and two oppositely-wound field windings, comprises two semiconductor static switching devices, such as thyristors, each connected in series with the armature and a respective one of the field windings, control means for varying the mark-to-space ratio of conduction of each switching device thereby to vary the mean voltage applied to the motor, one or other of the switching devices being brought into operation to energize the associated field winding in dependence on the desired direction of drive of the armature. The control means is adapted, when the mark-to-space ratio of one of the static switching devices has been brought to a predetermined maximum value, to cause simultaneous operation of the other static switching device at a lower mark-to-space ratio thereby to energize the associated field winding so as to reduce the net flux in the motor and further increase the motor speed.

5 Claims, 2 Drawing Figures

FIELD WEAKENING SYSTEM FOR PULSE-CONTROLLED THREE-TERMINAL D.C. MOTOR

This invention relates to pulse control circuits for d.c. motors.

In particular, the invention relates to motors of the kind having two field windings wound in opposite senses, so that the direction of drive of the motor can be selected by energising one or other of the field windings. Such motors are often referred to as three-terminal motors, having one armature terminal and two field terminals, since the junction of the armature with the two field windings is not normally accessible.

There are known pulse control circuits for such motors which employ two main thyristors each connected in series with the armature and a respective one of the field windings, firing circuit means and commutating means for the two main thyristors and means for controlling the mark-to-space ratio of switching of the main thyristor, one or other of the main thyristors being brought into operation in dependence upon the desired direction of drive of the armature.

It is advantageous with such control circuits to avoid the use of a by-pass contactor connected across each main thyristor to connect the motor directly to the d.c. supply when full speed is required. Without a by-pass contactor, however, the full speed of the motor is slightly reduced, since the maximum voltage which can be applied to the motor is reduced by the small loss in the main thyristor. It is known in conventional, single field, d.c. series motor, to increase the full speed of the motor by reducing the field current by means of a contactor or solid state switch connected in series with a resistor across the field winding. When the contactor is closed, part of the armature current is diverted from the field winding so that the field current is reduced, causing an increase in the speed of rotation of the armature. Since a reduction in the field current entails a reduction in the available motor torque, it is usual to provide a feedback circuit to open the contactor to remove the current diversion path if the armature current exceeds a predetermined value, to allow the motor torque to increase. It would be possible to employ such a field weakening system with a three-terminal motor, but this would have the disadvantages that an additional contactor or switch and a resistor are required, and that the transistion between the diverted and non-diverted field condition is a single step transition with no control over the degree of field reduction.

This invention consists in a pulse control circuit for a d.c. series motor having an armature and two oppositely-wound field windings, comprising two semiconductor static switching devices each connected in series with the armature and a respective one of the field windings, control means for alternately switching on and off each static switching device and for varying the mark-to-space ratio of conduction of each switching device thereby to vary the mean voltage applied to the motor, one or other of the switching devices being brought into operation to energise the associated field winding in dependence on the desired direction of drive of the armature, in which the control means is adapted, when the mark-to-space ratio of one of the static switching devices has been brought to its maximum value, to cause simultaneous operation of the other static switching device at a lower mark-to-space ratio thereby to energise the associated field winding so as to reduce the net flux in the motor.

By energising the field winding associated with "reverse" drive, for example, at a low mark-to-space ratio when the motor is being driven forwards with the "forward" field winding energised at maximum mark-to-space ratio, the net flux in the motor is reduced and its speed (for a given torque) increased. Since the flux generated by the "reverse" field winding is substactive from that of the "forward" winding, the current through the "reverse" winding required to produce a given reduction in the motor flux is less than the current that would need to be diverted through a resistor as in the known system to produce the same effect. The invention thus enables the maximum motor speed to be increased by "field weakening", without the need for additional contactors and resistors in the power circuit. Moreover, since the current in the "reverse" field winding can be varied by varying the mark-to-space ratio of conduction of the associated static switching device, the additional speed of the motor can be controlled.

Feedback circuitry may be provided to reduce the energisation of the "reverse" field winding if the armature current exceeds a predetermined value.

The static switching devices are preferably thyristors, the control means including circuitry for commutating the thyristors. Alternatively, the switching devices may be transistors.

Figure 2:
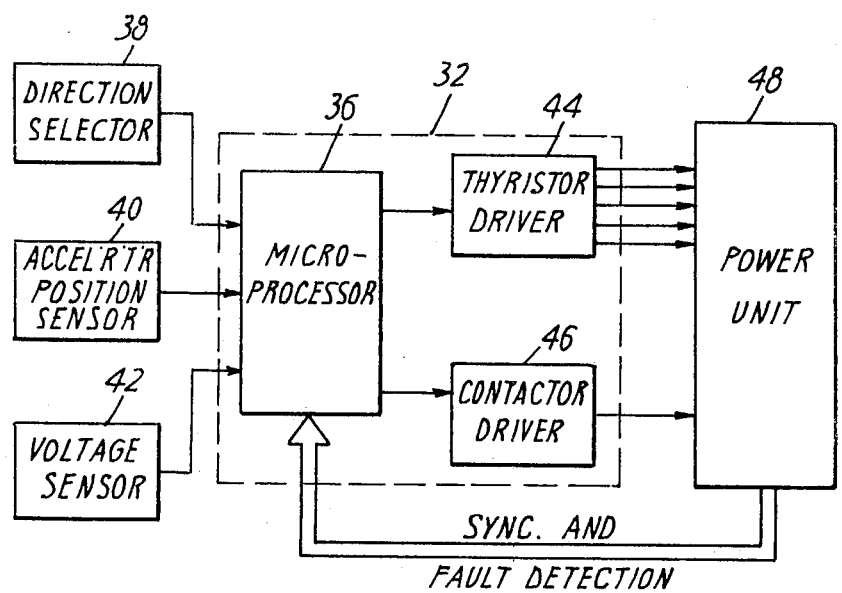

The invention will now be described, by way of example with reference to the accompanying drawings, in which:

FIG. 1 is a circuit diagram of a three terminal electric motor provided with a pulse control circuit in accordance with the invention, and FIG. 2 is a block diagram of part of the circuit of FIG. 1.

Referring to the drawing, a three-terminal motor 10 has an armature 12 and two field windings $14_F$ and $14_R$ connected to one side of the armature 12 at a common point 16. The other side of the armature is connected to the positive terminal of a battery 20 through a normally-open line contactor 8. Field windings $14_F$ and $14_R$ are connected separately to the negative terminal of the battery through respective main thyristors $22_F$ and $22_R$, so that they can be separately energised. The field windings $14_F$ and $14_R$ are wound in opposite senses, so that energisation of winding $14_F$ produces a driving torque in the "forward" direction whilst energisation of winding $14_R$ produces a driving torque in the "reverse" direction.

Main thyristors $22_F$ and $22_R$ are provided with a commutation circuit consisting of a common commutating capacitor 24 which is connected in series with a commutating thyristor $26_F$ across main thyristor $22_F$ and in series with a commutating thyristor $26_R$ across main thyristor $22_R$. A charge reversal thyristor 28 is connected in series with an inductor 30 across the commutating capacitor 24. The various thyristors are fired by signals from control circuit 32. When the motor is to be driven forwards a signal from a direction switch or direction selector circuit 38 (FIG. 2) causes the control circuitry to pulse main thyristor $22_R$ whilst main thyristor $22_R$ remains commutated.

A freewheel diode $34_F$ is connected across field winding $14_F$ and armature 12. A second freewheel diode $34_R$ is similarly connected across field winding $14_R$ and armature 12.

As shown in FIG. 2, the control circuitry 32 includes a microprocessor 36 which receives inputs from the direction selector 38, an accelerator position sensor 40, and a motor current sensor 42, which monitors the voltage across a shunt 36 in series with the armature 12. The microprocessor 36 controls firing circuits 44 which supply gating signals to the thyristors $22_F$, $22_R$, $26_F$, $26_R$ and 24 of the power circuit 48 and a contactor driver circuit 46 which controls the operation of the line contactor 8. The construction and operation of these components and the programming of the microprocessor may take well-known forms. The accelerator position sensor may for example comprise a potentiometer coupled to the accelerator pedal of a vehicle driven by the motor 10.

In operation, to drive the motor "forwards", main thyristor $22_F$ is alternately fired and commutated to energise the "forward" field winding $14_F$, whilst main thyristor $22_R$ remains non-conducting. The mean voltage applied to the motor is controlled by controlling the mark-to-space ratio of conduction of the thyristor $22_F$, i.e. the ratio of periods of non-conduction of the thyristor, in response to the accelerator position sensor 40. As long as the thyristor $22_F$ is operated at a mark-to-space ratio less than a predetermined maximum, the main thyristor $22_R$ remains non-conducting. If, when the thyristor $22_F$ is pulsing at maximum mark-to-space ratio, a higher speed is demanded, e.g. by the vehicle operator further depressing the accelerator pedal, the control circuit 32 supplies firing signals to the main thyristor $22_R$ so that current flows through the "reverse" field winding $22_R$. The flux generated by the "reverse" field winding $22_R$ opposes that generated by the "forward" field winding $22_F$, so that the net flux in the motor is reduced, causing an increase in the motor speed.

The thyristor $22_R$ is initially operated at a low mark-to-space ratio, the mark-to-space ratio being increased as a higher speed is demanded by the operator, up to a predetermined maximum value. For example, the field weakening may be used simply to compensate for the absence of a by-pass contactor by enabling the motor to be brought up to the speed which could be obtained with a by-pass contactor, or could be used to obtain even higher speeds, as with conventional field weakening systems, typically up to 70% above the normal maximum speed.

Since the reduction in the net motor flux reduces the available motor torque, a feedback circuit is provided to reduce the mark-to-space ratio of conduction of the main thyristor $22_R$ if the motor current exceeds a predetermined value, for example if the vehicle begins to climb a hill. The feedback signal may be obtained, for example, from a shunt 36 in the motor circuit. The control circuitry 32 may be arranged to reduce the mark-to-space ratio of conduction of thyristor $22_R$ to a value which reduces the motor current to the predetermined value, so that the system will act as a current limit.

It will be apparent that the field weakening system can operate similarly when the motor is being driven in reverse, the field reduction being then obtained by operating the main thyristor $22_F$ to energise the "forward" field winding $14_F$.

In the embodiment shown in the drawing, the two main thyristors $22_F$ and $22_R$ are provided with a common commutating circuit. When both thyristors are being operated as described above, they can be simultaneously commutated at pre-set intervals by simultaneously gating the commutating thyristors $26_F$ and $26_R$, the two main thyristors $22_F$ and $22_R$ then being separately so that their mark-to-space ratios can be independently controlled. It will be appreciated that the invention could also be applied to a system in which separate pulse controllers, i.e. main thyristors each with its own commutation circuit, were provided in series with the resepective field windings.

I claim:

1. A pulse control circuit for a d.c. series motor having an armature and two oppositely-wound field windings, comprising two semiconductor static switching devices each connected in series with the armature and a respective one of the field windings, control means for alternately switching on and off each static switching device and for varying the mark-to-space ratio of conduction of each switching device thereby to vary the mean voltage applied to the motor, one or other of the switching devices being brought into operation to energise the associated field winding in dependence on the desired direction of drive of the armature, in which the control means is adapted, when the mark-to-space ratio of one of the static switching devices has been brought to a predetermined maximum value, to cause simultaneous operation of the other static switching device at a lower mark-to-space ratio thereby to energise the associated field winding so as to reduce the net flux in the motor.

2. A pulse control circuit as claimed in claim 1, in which means are provided for varying the mark-to-space ratio of conduction of said other static switching device thereby to vary the reduction in the net motor flux.

3. A pulse control circuit as claimed in claim 2, in which means are provided for sensing the armature current and for reducing the mark-to-space ratio of conduction of said other static switching device if the armature current exceeds a predetermined value.

4. A pulse control circuit as claimed in any one of claims 1 to 3, in which each static switching device is a thyristor.

5. A pulse control circuit as claimed in any one of claims 1 to 3, in which each static switching device is a transistor.

* * * * *